United States Patent [19]

Carden

[11] Patent Number: 4,842,324

[45] Date of Patent: Jun. 27, 1989

[54] COVER FOR THE CAB PORTION OF AN AUTOMOBILE

[76] Inventor: Harvey K. Carden, 4550 Via Bella Vista, Yorba Linda, Calif. 92686

[21] Appl. No.: 236,281

[22] Filed: Aug. 24, 1988

Related U.S. Application Data

[63] Continuation of Ser. No. 61,956, Jun. 15, 1987, abandoned.

[51] Int. Cl.[4] .............................................. B60J 11/00
[52] U.S. Cl. .................................. 296/136; 296/95.1; 160/370.2; 150/166
[58] Field of Search ................. 296/95.1, 98, 136; 160/370.2; 150/52 K

[56] References Cited

U.S. PATENT DOCUMENTS

| | | | |
|---|---|---|---|
| 2,608,198 | 8/1952 | Goodman | 150/52 K |
| 2,690,928 | 10/1954 | Boynes | 160/368.2 |
| 2,718,912 | 9/1955 | Zimmerman | 296/95 C |
| 2,821,248 | 1/1958 | Irvine | 296/95 C X |
| 3,042,111 | 7/1962 | Wytovich | 160/352 |
| 3,401,977 | 9/1968 | Schamel | 296/136 |
| 3,874,437 | 4/1975 | Black | 296/95 C X |
| 4,209,197 | 6/1980 | Fischer | 296/136 |
| 4,216,989 | 8/1980 | Tackett | 296/136 |
| 4,355,839 | 10/1982 | Rosen | 296/136 |
| 4,596,418 | 6/1986 | Koh | 296/136 |
| 4,612,967 | 9/1986 | Kamen et al. | 150/52 K |
| 4,635,993 | 1/1987 | Hooper et al. | 296/95 C |

FOREIGN PATENT DOCUMENTS

| | | | |
|---|---|---|---|
| 625882 | 12/1962 | Belgium | 296/136 |
| 525202 | 5/1956 | Canada . | |
| 3446600 | 7/1986 | Fed. Rep. of Germany | 296/136 |
| 1580155 | 9/1969 | France | 296/95 C |
| 31207 | 12/1970 | Japan | 296/136 |
| 0097524 | 6/1983 | Japan | 296/136 |
| 101823 | 6/1983 | Japan | 296/136 |
| 1290862 | 9/1972 | United Kingdom | 296/95 C |

*Primary Examiner*—Dennis H. Pedder
*Attorney, Agent, or Firm*—John T. Matlago

[57] ABSTRACT

A cover for the cab portion of an automobile is provided to prevent the interior thereof from heating up when left standing in the sun. The cover comprises a four sided structure. When the cover is placed over the roof of an automobile, a tubular member on the bottom of the front portion thereof which lies over the windshield has the windshield wipers placed thereover and pockets formed on either side thereof are snugly fitted over external side view mirror units typically provided on an automobile. A rear tubular member on the bottom of the back portion of the cover which lies over the rear window is inserted into the opening provided on the hinged end of the open lift door of the trunk of the automobile. Upon pulling the rear tubular member into the trunk and then closing and locking the lift door, the cover is tautly held over the roof in a secure manner. The cover is further held on the cab portion by providing self fasteners for holding a portion of the cover lying over one of the side doors which enables this portion including the side pocket thereon to be freed so that a person can enter the automobile and manipulate the window on the opposite side door to trap a short tubular member attached on the undersurface of the cover. Upon leaving the automobile, the side pocket can again be fitted over the external side view mirror unit and the cover portion refastened to the rest of the cover.

5 Claims, 3 Drawing Sheets

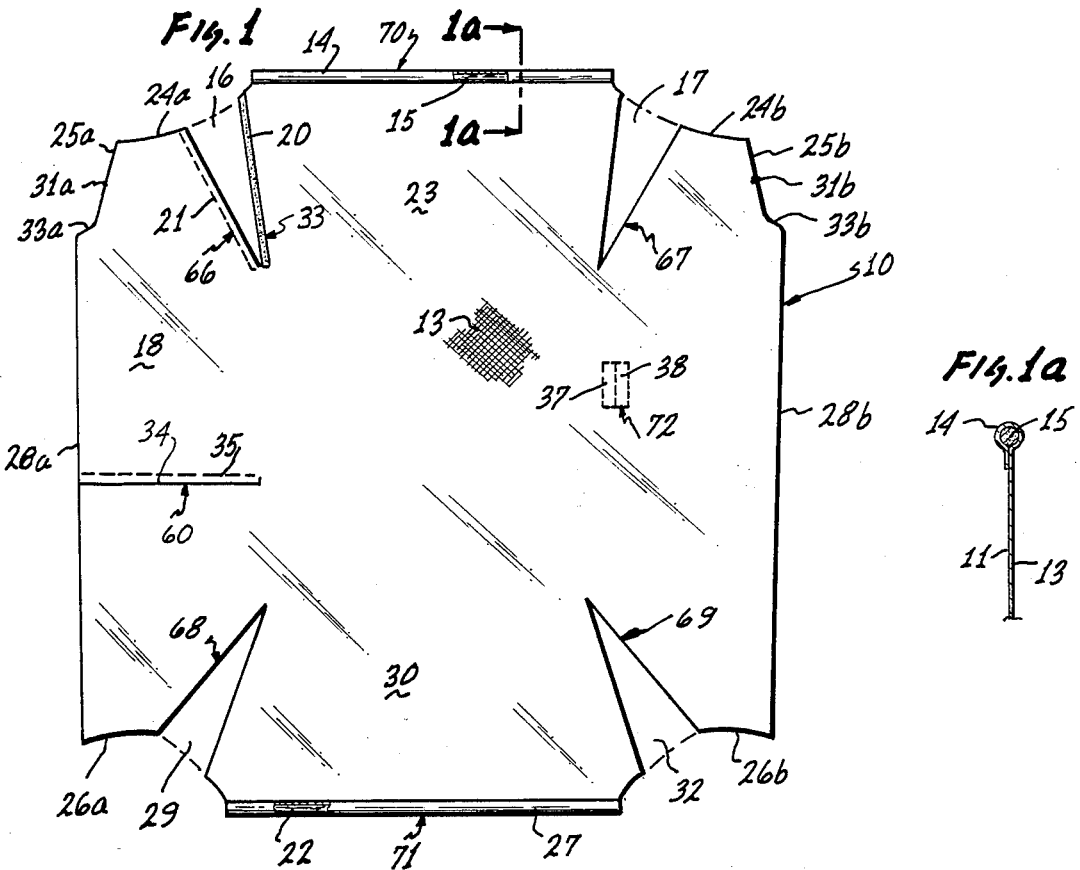
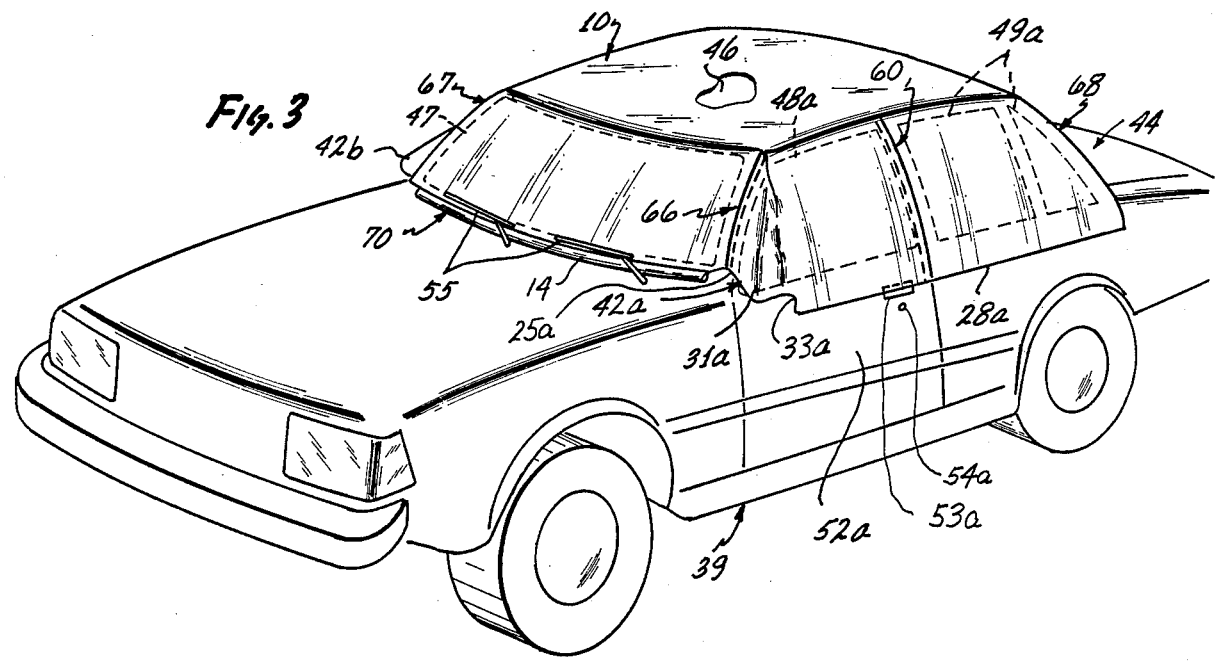

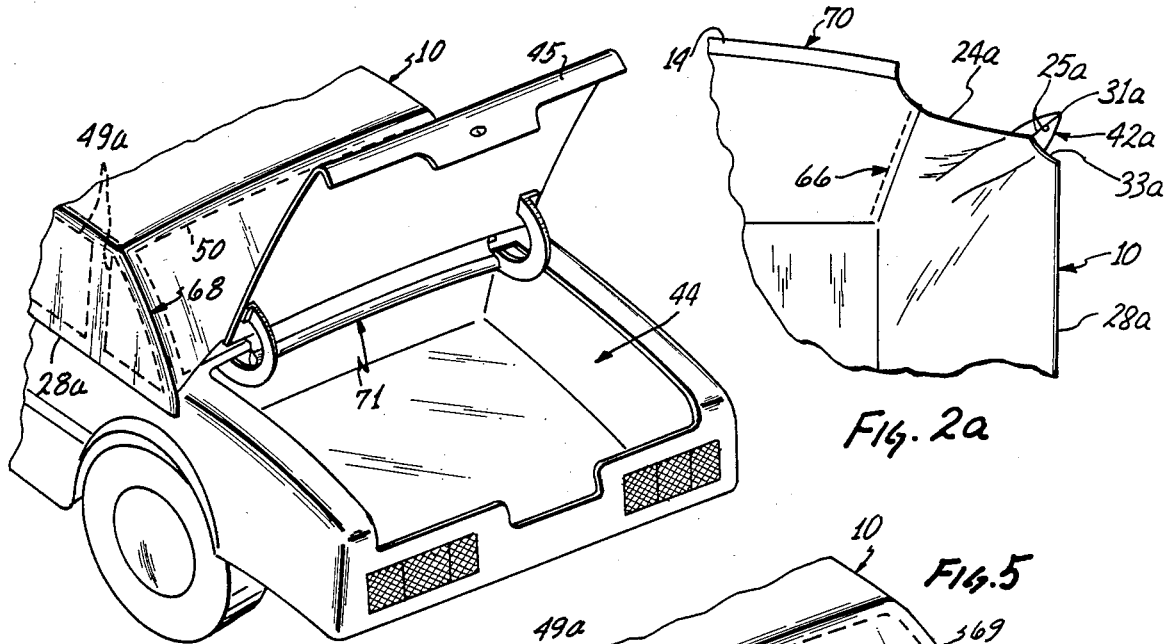
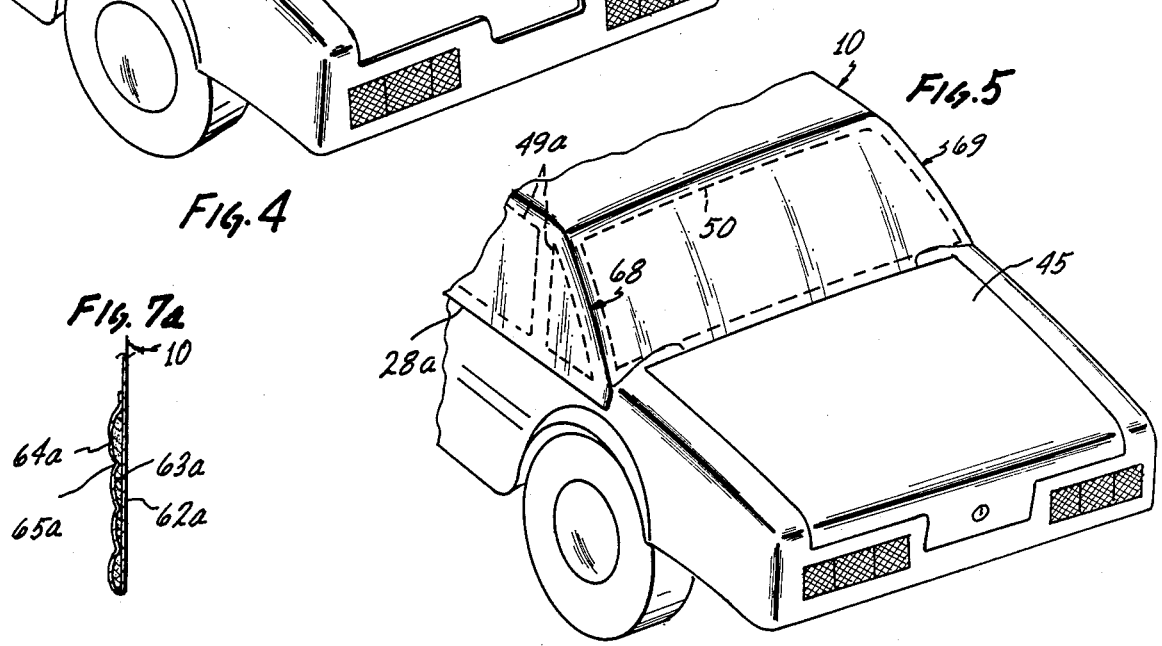
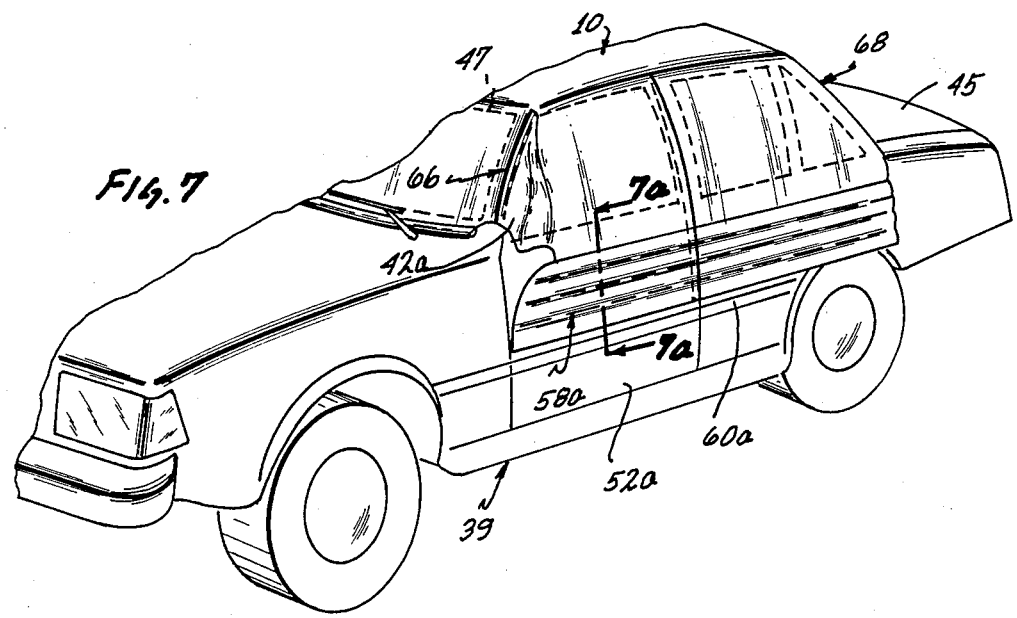

COVER FOR THE CAB PORTION OF AN AUTOMOBILE

This application is a continuation of application Ser. No. 061,956, filed June 15, 1987, abandoned.

BACKGROUND OF THE INVENTION

This invention relates to accessories for automobiles and more particularly to a cover for the cab portion of an automobile for preventing the interior thereof from heating up when left standing in the sun.

When an automobile is left parked outside for any length of time during the day when the sun is shining, and, in particular, in warm climate areas, such as the southern part of the United States, the interior of the cab portion of the automobile can heat up to extremely high temperatures because of the rays of the sun radiating through the windows of the automobile.

Although covers for the cab portion of an automobile have been previously devised, they have not been commercially successful because of a number of reasons, the primary ones being that these prior art covers lacked the ability to be easily and tautly positioned and held on the cab portion of the automobile in a theft-proof manner.

SUMMARY OF THE INVENTION

In accordance with the present invention, a cover for the cab portion of a conventional automobile is formed from a rectangular sheet of insulating material by providing a tubular member on the middle portion of each of the front and rear edges thereof and providing a V shaped cut at each of the corners thereof. The V shaped cut on one front corner is provided with fastener elements to form a detachably fastened joint and the V shaped cut on the other front corner and each of the rear corners are sewn to form seamed joints, thereby providing a four-sided cover. A detachably fastened side joint is also formed for a slit provided on the same side of the cover provided with the corner detachably fastened joint. In addition, the outer portion of each of the front corners is cut and sewen to form a pocket. Also, a short tubular member is attached to the undersurface of the cover on the side thereof opposite the side provided with the detachably fastened side joint.

When it is desired to use the cab cover, it is placed over the roof of the automobile with the front corner detachably fastened joint and the front corner seamed joint lying on the respective sides of the windshield frame and the two rear corner seamed joints lying on the respective sides of the rear window frame. With the cover so positioned, the windshield wipers are then placed over the front tubular member residing at the bottom of the windshield and the front corner pockets are snugly fitted over the external side view mirror units of the automobile. The rear tubular member is then inserted in the opening provided at the hinged end of the open trunk door of the automobile and after pulling the rear tubular member into the trunk the lift door thereof is closed and locked. As a result, the cover is tautly positioned and held over the cab portion of the automobile in a theft-proof manner.

To further assist in securing the cover on the cab portion of the automobile, the portion of the cover located between the detachably fastened joints and lying over the window portion of the side door is released and the front corner pocket thereon is slipped off the side view mirror unit so that the portion of the cover can be placed over the roof of the automobile, thereby enabling a person to open the side door, enter the automobile, lower the opposite side door window to pull the short tubular member on the undersurface of the cover into the interior of the automobile, and thereby trap the short tubular member when the window is raised. Upon departing from the automobile and locking the side door, the cover portion can then again be pulled down over the window portion thereof, the front corner pockets replaced and the detachably fastened joints closed.

Accordingly, one of the objects of the present invention is to provide an automobile cab cover having a combination of novel constructional features for use in tautly positioning and securing the cover on the cab portion of the automobile.

Another object of the present invention is to provide an automobile cab cover having integrally formed pockets on the front corners thereof which are adapted to snugly fit over the external side view mirror units provided on a conventional automobile so as to assist in positioning and securing the cover on the automobile.

Another object of the present invention is to provide an automobile cab cover with a tubular member extending transversely along the rear edge thereof which is inserted in the opening provided at the hinged end of the opened lift door of the trunk of the automobile and used to position and hold the cab cover on the roof thereof in a theft-proof manner when the lift door is closed and locked.

Another object of the present invention is to provide an automobile cab cover with a short tubular member attached on the undersurface thereof adjacent the top of the window of the side door of the automobile whereby upon rolling down the window, the short tubular member can be pulled into the interior of the cab portion and, upon rolling up the window, the short tubular member is trapped to help hold the cab cover on the automobile.

Still another object of the present invention is to provide detachably fastened joints on either side of the portion of an automobile cab cover that is lying over the window portion of one of the side doors thereof, whereby opening the joints enables a person to open the side door and enter the automobile to manipulate the window on the opposite side door to trap the short tubular member attached on the undersurface of the cab cover to thereby help in securing the cab cover on the automobile.

These and other objects, features and advantages of the present invention will be made more readily apparent from the following detailed description of the preferred embodiment as illustrated in the accompanying drawings.

BRIEF DESCRIPTION OF THE DRAWINGS

FIG. 1 is a top plan view of an automobile cab cover in accordance with the present invention;

FIG. 1a is a sectional view taken along lines 1a—1a of FIG. 1;

FIG. 2a is a bottom view of the cover with assembled pocket;

FIG. 3 shows the completely fabricated cab cover placed in position for use over the roof and window portions of the automobile;

FIG. 4 shows the rear tubular member on the cab cover inserted into the opening provided at the hinged end of the open lift door of the trunk of the automobile;

FIG. 5 shows the lift door of the trunk closed and locked to trap the rear tubular member therein;

FIG. 7 shows a modified cab cover provided with integral padded flaps on the lower sides thereof for protecting the sides of the automobile; and FIG. 7a is a sectional view of a side padded flap as taken along lines 7a—7a of FIG. 7.

PREFERRED EMBODIMENT

Figure 2:
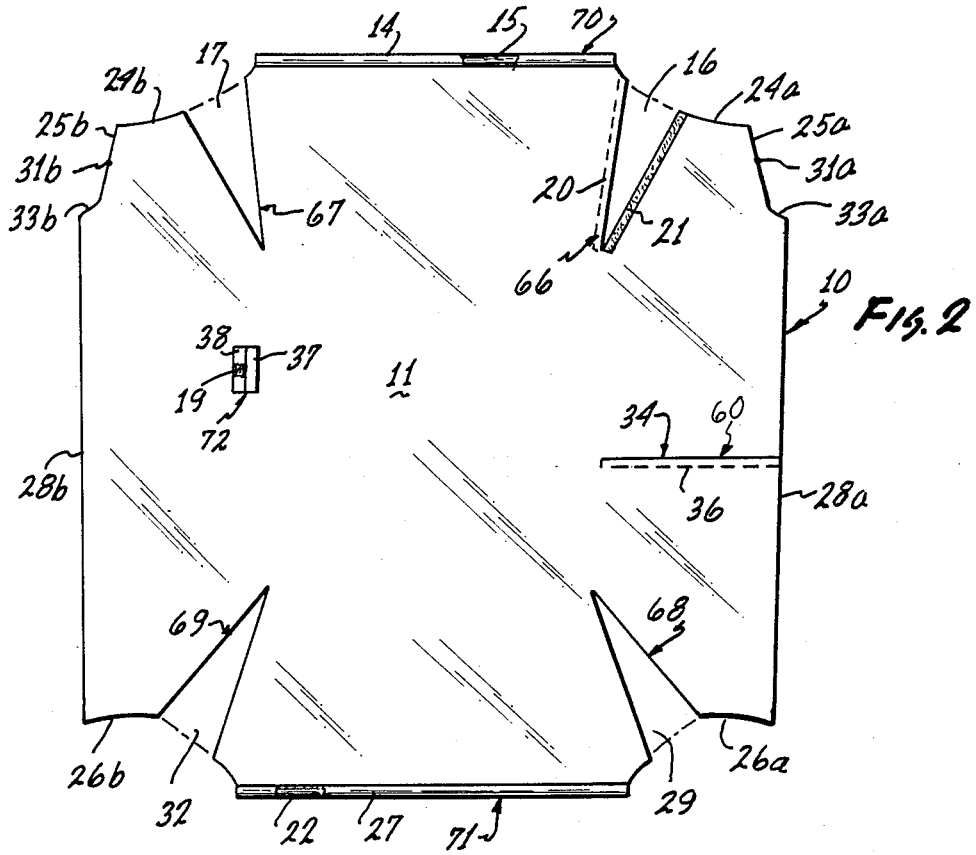
FIG. 2 is a bottom plan view of the automobile cab cover.

Reference will be made to FIG. 1 which shows a top plan view of the automobile cab cover 10 of the present invention. The cab cover 10 is cut from a rectangular sheet of flexible insulating polyester material having a suede undersurface 11 and a vacuum deposited aluminum outer coating 13 of the type sold under the trademark ROC-LON by Rockland Industries, Inc. The insulating material provides for reflecting the rays of the sun in a random fashion so as to not cause glare. The middle front edge portion of the cover 10 is cut and sewn to form a front tubular opening 14, and each of the front corner portions of the cab cover 10 is cut, starting from the respective ends of the tubular opening 14, to form an arcuate edge followed by a slightly angularly outwardly directed straight edge which terminates with a curved edge upon reaching the side thereof. Thus, the front left corner is cut to form an arcuate edge 24a followed by a slightly angularly directed straight edge 25a having a terminating curved edge 33a just before reaching the left side 28a of the cab cover. Likewise, the front right corner portion is cut to form an arcuate edge 24b followed by a slightly angularly directed straight edge 25b having a terminating curved edge 33b just before reaching the right side 28b of the cab cover.

Adjacent each end of the front tubular opening 14, the arcuate corner portion is cut to form a slightly inwardly directed V opening, such as V opening 16 on the left side and V opening 17 on the right side. A detachable fastener sold under the trademark Velcro can be and is preferably employed to close the V opening 16. Thus, the V opening 16 has a Velcro fastening tape 20 covered with flexible hooks secured along one edge thereof and a mating Velcro fastening tape 21 covered with soft loops secured along the undersurface of the other edge thereof. When the Velcro fastening tapes 20 and 21 are pressed together they engage to form detachably fastened joint 66. To reopen, the joint 66 is simply pulled apart.

The middle rear edge portion of the cover 10 is similarly cut and sewn to form a rear tubular opening 27, and each of the rear corner portions of the cab cover 10 is cut, starting from the respective ends of the tubular opening 27, to form an arcuate edge which extends to the respective outer sides of the cab cover. Thus, the rear left corner is cut to form an arcuate edge 26a which extends to the left side 28a and the rear right corner is cut to form an arcuate edge 26b which extends to the right side 28b. Similarly, adjacent each end of the rear tubular opening 27, the arcuate corner portion is cut to form a slightly inwardly directed V opening, such as V opening 29 on the left side and V opening 32 on the right side.

In addition, a side slit 34 is cut on the left side of the cab cover 10 and a Velcro fastening tape 35 is sewn to the undersurface of one edge thereof and a Velcro fastening tape 36 (FIG. 2) is sewn to the top surface of the other edge thereof such that the tapes 35 and 36 can be mated to hold the side slit 34 closed thereby forming detachably fastened joint 60.

Also a short flap 37 has one end thereof sewn on the undersurface of the cab cover 10 (FIG. 2) and has its free end portion folded back and sewn to form a short tubular opening 38.

It should now be clearly understood that the plan view of the cab cover 10 shown in FIGS. 1 and 2 is formed into a four-sided structure by overlapping and sewing the edges of each of the corner V openings 17, 19 and 32 to form seamed joints 67, 68 and 69, respectively, and by closing the corner V opening 16 by mating its Velcro fastening tapes 20 and 21 to form a detachably fastened corner joint 66.

In addition, the left front corner portion of the cab cover with the straight edge 25a is folded over on itself at its middle point 31a and its edge halves sewn together to form a left side pocket 42a (FIG. 2a). Likewise, the right corner portion with th straight edge 25b is folded over on itself at its middle point 31b and its edge halves sewn together to form a right side pocket 42b.

It should be noted that a length of rope 15 corresponding to the length of front tubular opening 14 is inserted therein to form front tubular member 70, a length of rope 22 corresponding to the length of rear tubular opening 27 is inserted therein to form rear tubular member 71, and a length of rope corresponding to the length of the short tubular opening 38 is inserted therein to form short tubular member 72 (FIG. 2).

Figure 6:
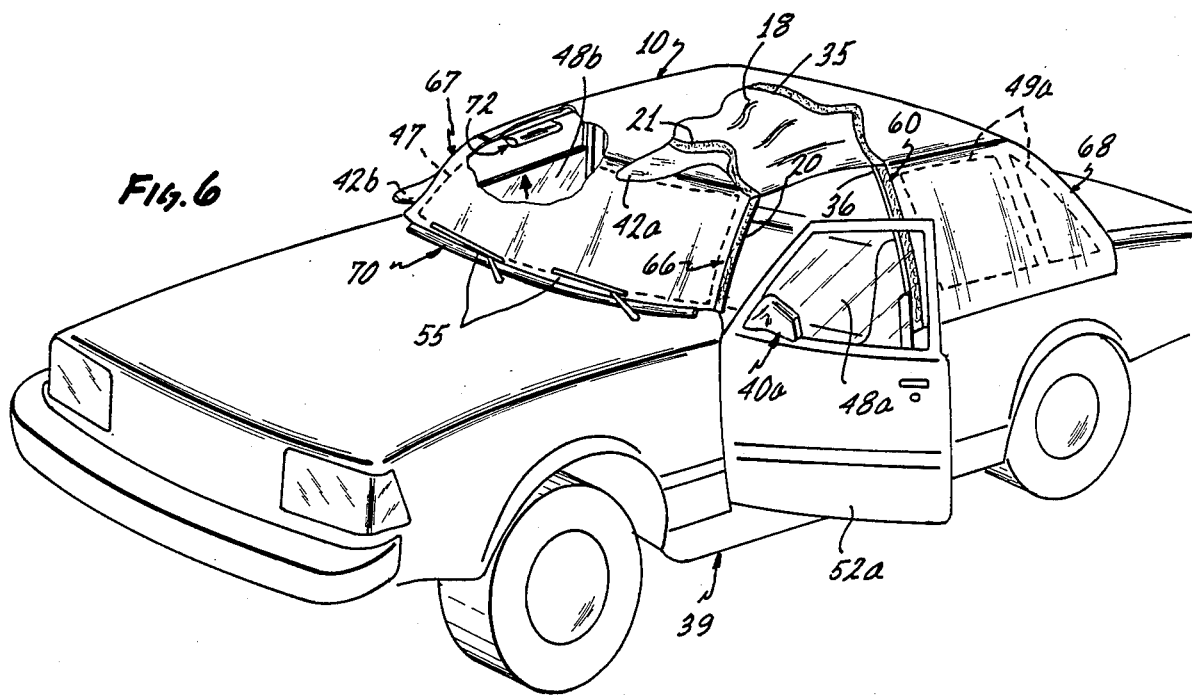
FIG. 6 shows the side portion of the cab cover located between the detachably fastened joints released and thrown over the roof of the automobile to enable the left side door to be opened so that a person can enter the automobile.

Reference will next be made to FIG. 3 which shows a conventional automobile 39 on which the cab cover 10 may be positioned for use. The cab portion of the automobile includes a roof 46, a windshield 47, side door windows 48a and 48b, rear windows 49a and 49b, and a rear window 50 (FIG. 4). In addition, the typical automobile includes side doors 52a and 52b, windshield wipers 55 located on the bottom corner of the windshield 47, and a rear trunk 44 with a lift door 45 (FIGS. 4 and 5). Also, it should be noted that automobiles typically are provided with external projecting side view mirror units, such as 40a and 40b (FIG. 6), on each side thereof. These side view mirror units are mounted in the front corners of the window frames of the sidedoors 52a and 52b and are thus positioned adjacent the lower ends of the side frames of the windshield 47 when the side doors 52a and 52b are closed.

As illustrated in FIG. 3, when the cab cover 10 is to be used it is initially placed over the roof 46 of the automobile with the detachably fastened joint 66 generally positioned over the left corner side of the windshield 47 and the front seamed joint 67 generally positioned over the right corner side of the windshield 47. When so positioned, the front tubular member 70 is lying on the bottom corner or well of the windshield 47 with the windshield wipers 55 positioned thereabove. The left side pocket 42a and the right side pocket 42b are then snugly fitted over the respective left and right external side view mirror units 40a and 40b. The cab cover is then pulled back over the roof 46 with the rear seamed joint 68 generally positioned over the left corner side of the rear window 50 and the rear seamed joint 69 generally positioned over the right side of the rear window 50. When so positioned, the rear portion 30 of cover 10 located between the rear seamed joints 68 and 69 lies over the rear window 50 and the rear tubular member 71 is inserted through the opening provided on the hinged end of the opened lift door 45 so as to extend into the trunk 44, as shown in FIG. 4. The rear tubular member 71 can then be pulled into the trunk 44 of the automobile to take up any slack in the cab cover 10 whose front end is being held by the front corner pockets 42a and 42b. The cab cover 10 is then held in position when the trunk lift door 45 is closed with the result that the cover 10 snugly and tautly fits over the cab portion of the automobile including the roof 46, the windshield 47, the side windows 48a and 48b of the side doors 52a and 52b, the rear side windows 49a and 49b, and the rear window 50.

It should now be clearly understood that the insertion of the transverse rear tubular member 71 within the opening provided on the hinged end of the opened lift door 45 of the trunk 44 followed by the closing and locking of the lift door 45 assures that an unauthorized person can not remove the cab cover from the automobile.

Next to be noted is that at the time the cab cover 10 is positioned over the roof 46 of the automobile, the short tubular member 72 on the undersurface of the cab cover 10 is positioned adjacent the top of the window 48b of the right side door 52b. It should be further noted that the detachably fastened joints 66 and 60 provided on the left side of the cab cover are located along the front and rear edges of the window 48a of the left side door 52a. Thus, by first pulling open each of the joints 66 and 60 and then slipping off the left side pocket 42a from the left side view mirror unit 40a which is mounted on the side door 52a, the portion 18 of the cab cover lying between the joints 66 and 60 can be freed so that it can be folded up over the roof 46, thus making it possible for the side door 52a to be swung open.

This enables a person to enter the automobile 19 by way of the open left side door 52a and lower the window 48b on the right side door 52b so that the short tubular member 72 can be pulled into the interior of the automobile and trapped therein upon the raising of the window 48b. The person, upon leaving the automobile by way of the left side door 52a, can then close and lock the door. The left side pocket 42a can then again be placed over the left side view mirror unit 40a and the portion 18 of the cab cover 10 again pulled down over the window 48a of the left side door 52a and the detachable fasteners of the joints 60 and 66 again closed.

Reference will next be made to FIG. 7 which shows a modified version of the automobile cab cover 10 with an integrally formed padded flap 58a and 58b extending down from the side bottoms 28a and 28b of the cab cover. The padded flap 58a extends down from the side of the cab cover just behind the side pocket 42a formed thereon and its front edge is preferably rounded to extend further forward to ensure that the front sidewall of the door 52a is covered. The rear edge of the padded flap 58a preferably extends to the rear edge of the rear window 49a. The bottom of the padded flap 38a extends down to an upper molding 60a, for example, that defines the outer most projection provided on the sidewall of the automobile.

FIG. 7a shows a cross sectional view of the padded flap 58a. As noted, at the time the cab cover is fabricated, a sheet of cotton padding 63a, for example, is placed over the outer surface of the extended portion 62a of the cab cover 10 and an outer sheet made of a material similar to that used for cab cover 10 is placed over the sheet of cotton padding. Spaced longitudinally extending seams 65a are then sewn throughout the length and breadth of the padded flap. The padded flap 58b on the opposite side of the automobile is similarly constructed and disposed.

While the invention shown and described herein has been adapted to fulfill the objects and advantages previously mentioned as desirable, it is to be understood that the invention is not limited to the specific features shown and described but that the means and configuration herein disclosed are susceptible of modification in form, proportion and arrangement of parts without departing from the principle involved or sacrificing any of its advantages and the invention is therefore claimed in embodiments of various forms all coming within the scope of the claims which follow.

What is claimed is:

1. A cover for the cab portion of an automobile, said cab portion including a roof, a windshield having sides and a bottom, a rear window having sides, and side windows on each side of the automobile, said automobile further including wipers located at the bottom of said windshield, a sidedoor on each side of the automobile, each sidedoor having a window frame in which the side window resides, each window frame having a lower front corner, a rear trunk having a lift door with a hinged end, and an external side view mirror unit mounted on each sidedoor adjacent the lower front corner of the window frame thereof, said covering comprising:

a generally rectangular sheet of insulating material having front corner portions and rear corner portions, each corner portion having an arcuate edge with an inwardly directed V shaped opening thereon, a front corner joint provided on each front corner portion by joining the edges of the V shaped opening thereon and a rear corner joint provided on each rear corner portion by joining the edges of the V shaped opening thereon, thereby forming a four-sided cover including a front side and a rear side, each with an outer edge, and opposite lateral sides;

a pocket integrally formed on an outer portion of the lateral side of each front corner portion of the cover and spaced outwardly from the front corner joint thereon;

a front transverse tubular member on the outer edge of the front side of the cover; and a rear transverse tubular member on the outer edge of the rear side of the cover;

said cover placed over the roof of the automobile with the front corner joints thereof lying over the sides of the windshield, the rear corner joints lying over the sides of the rear window, and the front transverse tubular member located at the bottom of the windshield with the wipers positioned thereover; and each said front corner pocket snugly fitting over the external side view mirror unit mounted on the lower front corner of the window frame of the sidedoor on a respective side of the automobile; and said lift door of said trunk upon being opened forming a gap at its hinged end through which said rear transverse tubular member is inserted and pulled and then trapped when the lift door is closed;

whereby the cover is tautly positioned and held in a theft proof manner on the cab portion of the automobile.

2. A cover for the cab portion of an automobile as defined in claim 1 wherein:

the front corner joint of the cover on one side of the windshield is provided with a detachable fastener;

the window frame on the sidedoor located adjacent said one side of the windshield has a rear edge;

a slit is provided on the lateral side of the cover on said one side of the windshield so as to be located along the rear edge of the window frame of said sidedoor, an additional joint is provided by joining the edges of said slit with a detachable fastener;

said cover having an inner surface; and a short tubular member having a flap attached on the inner surface of the cover at a location above the window frame for the side window adjacent the oposite side of the windshield;

whereby by opening both said joints provided with detachable fasteners, the sidedoor located adjacent said one side of the windshield can be entered to lower the side window on the sidedoor adjacent the opposite side of the windshield, pull in said short tubular member, and raise said side window, thereby further securing the cover on the automobile.

3. A cover for the cab portion of an automobile as defined in claim 1 wherein said insulating material is a polyester having a suede inner surface and an aluminum coated outer surface which reflects the rays of the sun in a random manner.

4. A cover for the cab portion of an automobile as defined in claim 1 wherein the pocket provided on each front corner portion of the cover is formed by cutting a slightly angularly outwardly directed straight edge on a portion of the lateral side spaced outwardly from the V shaped opening thereat, folding the straight edge at its midpoint over on itself, and sewing the halves of the folded straight edge together.

5. A cover for the cab portion of a vehicle, said cab portion including a roof, a windshield having sides and a bottom, a rear window having sides, and side windows on each side of the vehicle, said vehicle further including wipers located at the bottom of said windshield, a sidedoor on each side of the vehicle, each sidedoor having a window frame in which the side window resides, each said window frame having a lower front corner, and an external side view mirrow unit mounted on each sidedoor adjacent the lower front corner of the window frame thereof, said cover comprising:

a generally rectangular sheet of insulating material having front corner portions and rear corner portions, each corner portion having an arcuate edge with an inwardly directed V shaped opening thereon, a front corner joint provided on each front corner portion by joining the edges of the V shaped opening thereon and a rear corner joint provided on each rear corner portion by joining the edges of the V shaped opening thereon, thereby forming a four-sided cover including a front side and a rear side, each with an outer edge, and opposite lateral sides;

a pocket formed on an outer portion of the lateral side of each front corner portion of the cover and spaced outwardly from the front corner joint thereon; and a front transverse tubular member on the outer edge of the front side of the cover;

said four-sided cover placed over the roof of the vehicle with the front corner joints thereof lying over the sides of the windshield, the rear corner joints lying over the sides of the rear window, and the front transverse tubular member located at the bottom of the windshield with the wipers positioned thereover; and each said front corner pocket snugly fitting over the external side view mirror unit mounted on the lower front corner of the window frame of the sidedoor on a respective side of the vehicle; and means for securing the outer edge of the rear side of said cab cover to said vehicle after positioning said cover in a taut manner over the cab portion of the vehicle.

* * * * *